US010887024B2

(12) United States Patent
Holzheimer et al.

(10) Patent No.: US 10,887,024 B2
(45) Date of Patent: Jan. 5, 2021

(54) OPTICAL BEAMFORMING PHOTONIC INTEGRATED CIRCUIT (PIC)

(71) Applicant: Raytheon Company, Waltham, MA (US)

(72) Inventors: Timothy R. Holzheimer, Rockwall, TX (US); Ricardo H. Paredes, Buellton, CA (US)

(73) Assignee: Raytheon Company, Waltham, MA (US)

( * ) Notice: Subject to any disclaimer, the term of this patent is extended or adjusted under 35 U.S.C. 154(b) by 7 days.

(21) Appl. No.: 16/150,766

(22) Filed: Oct. 3, 2018

(65) Prior Publication Data
US 2020/0112378 A1    Apr. 9, 2020

(51) Int. Cl.
*H04B 10/80*    (2013.01)
*H04B 7/06*    (2006.01)
*H04B 10/50*    (2013.01)
*H04B 10/69*    (2013.01)

(52) U.S. Cl.
CPC ......... *H04B 10/801* (2013.01); *H04B 7/0617* (2013.01); *H04B 10/505* (2013.01); *H04B 10/691* (2013.01)

(58) Field of Classification Search
CPC . H04L 310/801; H04B 7/0617; H04B 10/505; H04B 10/691
USPC .......................................................... 398/115
See application file for complete search history.

(56) References Cited

U.S. PATENT DOCUMENTS

| 3,170,158 | A | * | 2/1965 | Walter | ..................... | H01Q 3/46 |
| | | | | | | 342/376 |
| 4,814,773 | A | * | 3/1989 | Wechsberg | ............... | G01S 7/03 |
| | | | | | | 342/368 |
| 5,771,320 | A | | 6/1998 | Stone | | |

(Continued)

FOREIGN PATENT DOCUMENTS

| CA | 2 849 852 A1 | 10/2014 |
| WO | WO 03/079101 A1 | 9/2003 |

OTHER PUBLICATIONS

"Optical Implementation of Butler Matrix for Hardware-Efficient Multiuser Beannforming" Huiyuan Liu et al., vol. 10, No. 2, Apr. 2018 (Year: 2018).*

(Continued)

*Primary Examiner* — Abbas H Alagheband
(74) *Attorney, Agent, or Firm* — Daly Crowley Mofford & Durkee, LLP (57) ABSTRACT

Described embodiments provide methods and apparatus for processing radio-frequency (RF) signals using a photonic integrated circuit (PIC). The PIC comprises a substrate having integrated lasers and signal paths. Each signal path is configured to receive a single laser signal from the lasers. Each signal path comprises an electro-optic modulator (EOM), an optical butler matrix, and a photodetector. The EOM is communicatively coupled to the one or more lasers and is configured to generate an output optical signal by modulating the single laser signal based on an input radio frequency (RF) signal. The optical butler matrix is communicatively coupled to each of the one or more signal paths and is configured to generate an optical beamformed signal from the output optical signal. The photodetector is configured to convert the optical beamformed signal to an output RF signal.

19 Claims, 8 Drawing Sheets

(56) References Cited

U.S. PATENT DOCUMENTS

| | | | |
|---|---|---|---|
| 5,936,588 A * | 8/1999 | Rao | H01Q 3/24 |
| | | | 342/372 |
| 6,570,684 B1 | 5/2003 | Stone et al. | |
| 6,585,382 B1 | 7/2003 | Stone | |
| 10,012,797 B1 * | 7/2018 | Nagarajan | H01S 5/4087 |
| 10,224,628 B2 * | 3/2019 | Vidal Drummond | H04B 10/64 |
| 10,527,786 B2 * | 1/2020 | Leonberger | G02B 6/29352 |
| 2009/0022495 A1 * | 1/2009 | Welch | G02B 6/12004 |
| | | | 398/79 |
| 2010/0166424 A1 * | 7/2010 | Nagarajan | H01S 5/2231 |
| | | | 398/79 |
| 2010/0172611 A1 * | 7/2010 | Joyner | G02B 6/12019 |
| | | | 385/14 |
| 2012/0229886 A1 * | 9/2012 | Chen | H04B 10/506 |
| | | | 359/326 |
| 2013/0163992 A1 * | 6/2013 | Chung | H04J 14/0224 |
| | | | 398/79 |
| 2013/0279115 A1 * | 10/2013 | Blumenthal | G02B 6/4271 |
| | | | 361/700 |
| 2014/0320346 A1 * | 10/2014 | Caille | G02B 6/28 |
| | | | 342/375 |
| 2015/0023659 A1 * | 1/2015 | Sun | H04B 10/616 |
| | | | 398/34 |
| 2016/0109731 A1 * | 4/2016 | Huang | G02B 6/1225 |
| | | | 385/3 |
| 2017/0222729 A1 * | 8/2017 | Sadot | H04B 10/548 |
| 2017/0363823 A1 * | 12/2017 | Mentovich | G02B 6/4206 |
| 2018/0246351 A1 * | 8/2018 | Ho | G02F 1/01708 |
| 2018/0287333 A1 * | 10/2018 | Ooi | H01S 5/0265 |
| 2018/0332372 A1 * | 11/2018 | Liu | H04B 10/5161 |
| 2019/0072672 A1 * | 3/2019 | Yao | G01S 7/4812 |
| 2019/0339468 A1 * | 11/2019 | Evans | G02B 6/43 |
| 2019/0342009 A1 * | 11/2019 | Evans | H04B 10/503 |

OTHER PUBLICATIONS

De Domenico et al., "Making 5G Millimeter-Wave Communications a Reality;" IEEE Wireless Communications; Aug. 2017; 6 Pages.

Hassoon, "Design of New Optical Butler Matrix Beamforming Network for Phased Array Antenna;" Journal of Babylon University, vol. 18; Jan. 2010; 14 Pages.

Holzheimer, "Common Compact True Time Delay on a Photonic Integrated Circuit;" Raytheon—Space and Airborne Systems; Jan. 2014; 22 Pages.

Liu et al., "Optical Implementation of Butler Matrix for Hardware-Efficient Multiuser Beamforming;" IEEE Photonics Journal, vol. 10, No. 2; Apr. 2018; 9 Pages.

Piqueras et al., "Photonic Beamforming Network for Multibeam Satellite-on-Board Phased-Array Antennas;" PowerPoint Presentation from ICSO Conference in Toulouse; Oct. 14, 2008; 20 Pages.

PCT International Search Report and Written Opinion dated Nov. 14, 2019 for International Application No. PCT/US2019/045611; 15 Pages.

* cited by examiner

OPTICAL BEAMFORMING PHOTONIC INTEGRATED CIRCUIT (PIC)

BACKGROUND

Beamforming is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends to achieve spatial selectivity. Analog beamforming, be it passive or active, contains radio frequency (RF) components that include the following: Rotman Lenses, Butler Matrices, RF phase shifters and RF True Time Delay Monolithic Microwave Integrated Circuits (MMICs).

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In one aspect, a radio frequency (RF) photonic integrated circuit (PIC) comprises a substrate having integrated components. The integrated components comprise one or more lasers and one or more signal paths. The one or more lasers are configured to generate one or more laser signals. Each signal path of the one or more signal paths is configured to receive a single laser signal from the one or more lasers. Each signal path comprises an electro-optic modulator (EOM), an optical butler matrix, and a photodetector. The EOM is communicatively coupled to the one or more lasers and is configured to generate an output optical signal by modulating the single laser signal based on an input radio frequency (RF) signal. The optical butler matrix is communicatively coupled to each of the one or more signal paths and is configured to generate an optical beamformed signal from the output optical signal. The photodetector is configured to convert the optical beamformed signal to an output RF signal.

In an embodiment, the one ore more lasers are uncooled lasers. The uncooled lasers can have an operational wavelength that is substantially 1310 nm. In other examples, the uncooled lasers can have an operation wavelength that is any wavelength from 1310 nm to 1550 nm. In further examples, the laser's wavelength is a function of size constraints of the substrate. That is, the laser can have any operational wavelength if it can fit on the substrate.

In an embodiment, each signal path further comprises a silicon optical amplifier (SOA) communicatively coupled between the optical butler matrix and the photodetector. The SOA is configured to amplify the optical beamformed signal.

In an embodiment, the substrate with its integrated components is a 50Ω device. The substrate and its integrated components can also have an operational power requirement that is less than 0.75 watts.

Another aspect is a method. The method comprising providing a single optical channel for each input RF signal. Each optical channel processes a single input RF signal of a plurality of input RF signals by (I) converting the single input RF signal into an optical signal, (ii) generating a beamformed optical signal from the optical signal using an optical butler matrix, and (iii) converting the beamformed optical signal to an output RF signal.

In an embodiment, the method coverts the single input RF signal to an optical signal by modulating a laser signal based on the single input RF signal.

In an embodiment, the method includes generating the laser signal using an uncooled laser. The method can include generating the laser signal using an uncooled laser having an operating wavelength that any wavelength from 1310 nm to 1550 nm.

In an aspect, a RF device comprises one or more sensors, a photonic integrated circuit (PIC), and a processor. The one or more sensors are configured to receive one or more RF signals. The PIC is configured to optically generate an RF beamformed signal for each received RF signal.

In an embodiment the PIC can comprise a substrate that includes integrated components. The integrated components can comprise one or more lasers and one or more signal paths. The one or more lasers can be configured to generate one or more laser signals. Each of the one or more signal paths can be configured to receive a single laser signal from the one or more lasers. The PIC can be a 50Ω device. The PIC can also have an operational power requirement that is less than 0.75 watts.

Additionally, each signal path can comprise an electro-optic modulators (EOM), an optical butler matrix communicatively coupled to each of the one or more signal paths, and a photodetector. The EOM can be configured to generate an output optical signal by modulating the single laser signal based on an input radio frequency (RF) signal. The butler matrix can be configured to generate an optical beamformed signal from the output optical signal. The photodetector can be configured to convert the optical beamformed signal to an output RF signal.

In an embodiment, the one or more lasers can be uncooled lasers. The uncooled lasers can be a laser with an operational wavelength that is substantially 1310 nm. In other embodiments, the uncooled lasers can have an operational wavelength that is any wavelength from 1310 nm to 1550 nm.

In an embodiment, each signal path can further comprise a silicon optical amplifier (SOA) communicatively coupled between the optical butler matrix and the photodetector. The SOA can be configured to amplify the optical beamformed signal. In another embodiment, each signal path can further comprise a pair of RF input/output (I/O) ports.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
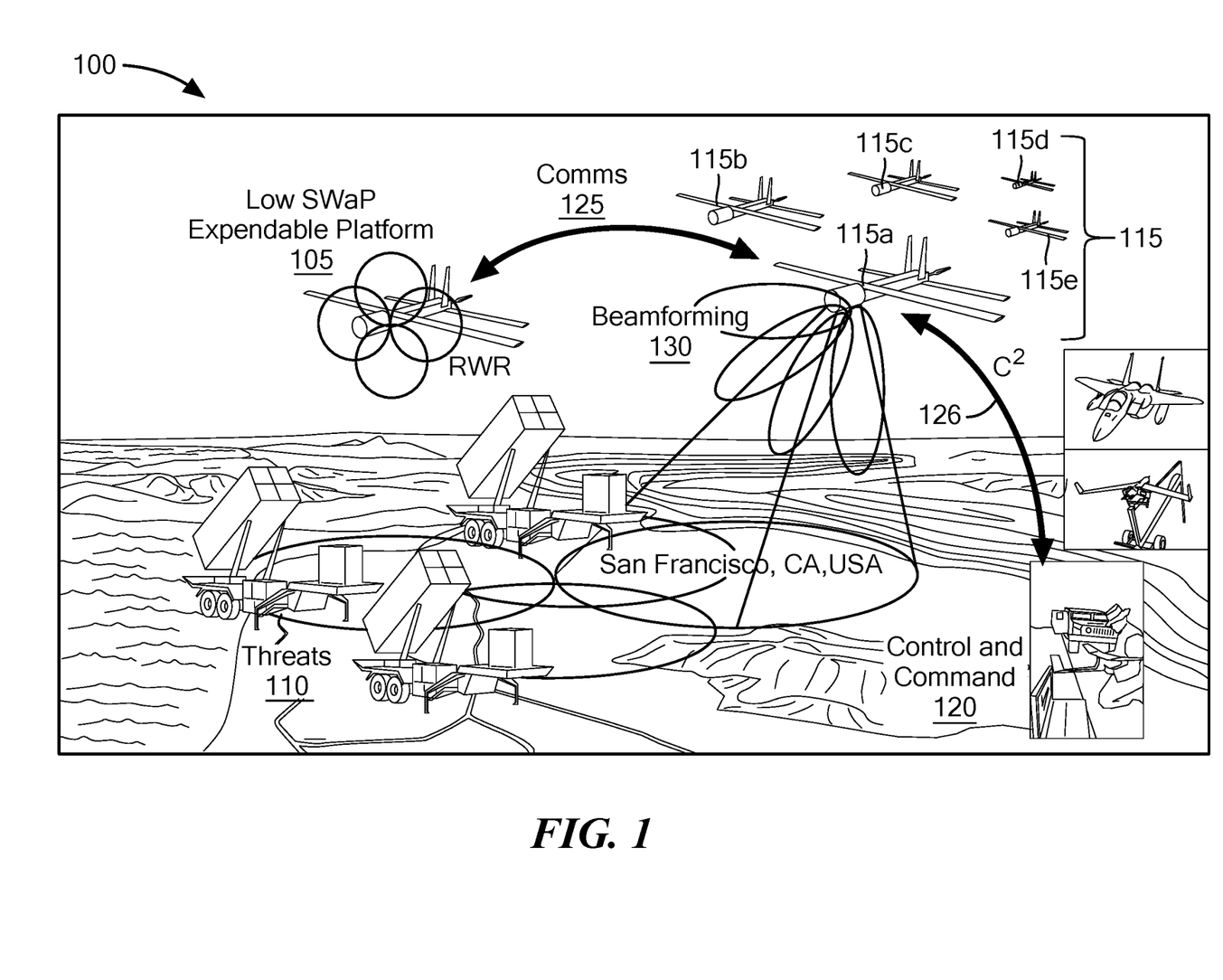
FIG. 1 shows a radio frequency (RF) environment in which a photonic integrated circuit (PIC) can be deployed in accordance with described embodiments.

FIG. 1 shows a radio frequency (RF) environment 100 in which a photonic integrated circuit (PIC) can be deployed in accordance with described embodiments. A control and command platform 120 can utilize airborne vehicles such as unmanned aerial vehicles (UAVs) 105, 115 to detect, identify, and destroy threats 110 such as enemy weapons radars and/or weapon systems. The command platform 120 controls the UAVs 105, 115 via a communication link 126. The communication link 126 can be any wireless RF communications link. A UAV can be provisioned to perform the functions of a radar warning receiver (RWR) UAV 105. The RWR UAV 105 acts as a scout to pre-detect potential threat objects and send pre-detection data to UAVs 115 via a UAV communications link 125. The UAVs 115 receive the pre-detection data corresponding to potential threat objects and use beamforming signals 130 to identify, target, and/or destroy the threats 110. Specifically, the UAVs 115 use location and/or range information, amongst other information, to direct RF energy toward the threats 110 to identify, target, and/or destroy them.

Current UAVs have limited multi-beam capability and have large SWAP because they use analog butler matrixes to generate beamforming signals, which is bandwidth limited (~4 octaves). Additionally, the size, weight, and power (SWaP) of such analog devices is large and not suitable for smaller RF applications.

UAVs would benefit from having simultaneous multi-beam capability to identify, target, and/or destroy the threats. Such simultaneous multi-beam capability would allow UAVs to generate, e.g., four simultaneous beams for detection as well as for use in self protect modes. Accordingly, the UAVs can leverage such multi-beam capability to detect multiple threat objects having different locations and ranges. For a tactical platform with severe weight constraints, a small SWAP device with simultaneous multi-beam beam capability would greatly enhance such platform systems.

Figure 2A:
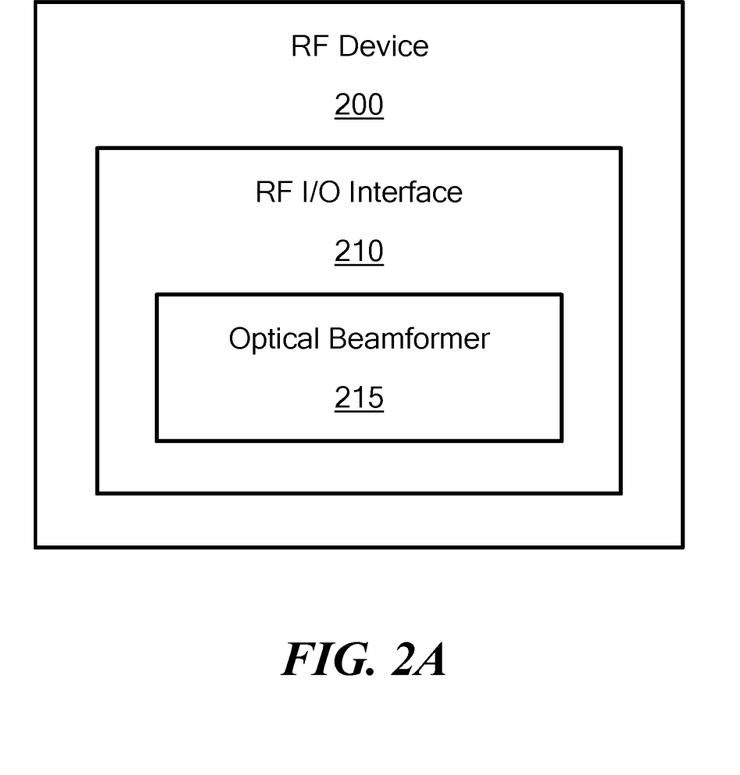
FIGS. 2A-B show a block diagram of a PIC that can be inserted into an RF device in accordance with described embodiments.

Aspects of the present disclosure relate to a small SWAP optical beamformer (e.g., the integrated PIC 215 of FIG. 2) with multi-beam capability. The optical beamformer includes an optical butler matrix that enables the optical beamformer to have a very wide instantaneous bandwidth. In some embodiments, the PIC is designed to have an instantaneous bandwidth from at least 1 Hz to 67 Ghz, and in other embodiments up to 90 GHz and/or 100 GHz. Additionally, the PIC can have a Spur Free Dynamic Range (SFDR) that is greater than 94 db/$Hz^{2/3}$. In contrast, current analog butler matrixes are limited to a 3:1 bandwidth, where 3:1 refers to the ratio of a start and stop frequency. For example, a device that operates from 6 GHz to 18 GHz (18/6=3) has a 3:1 ratio.

Figure 3:
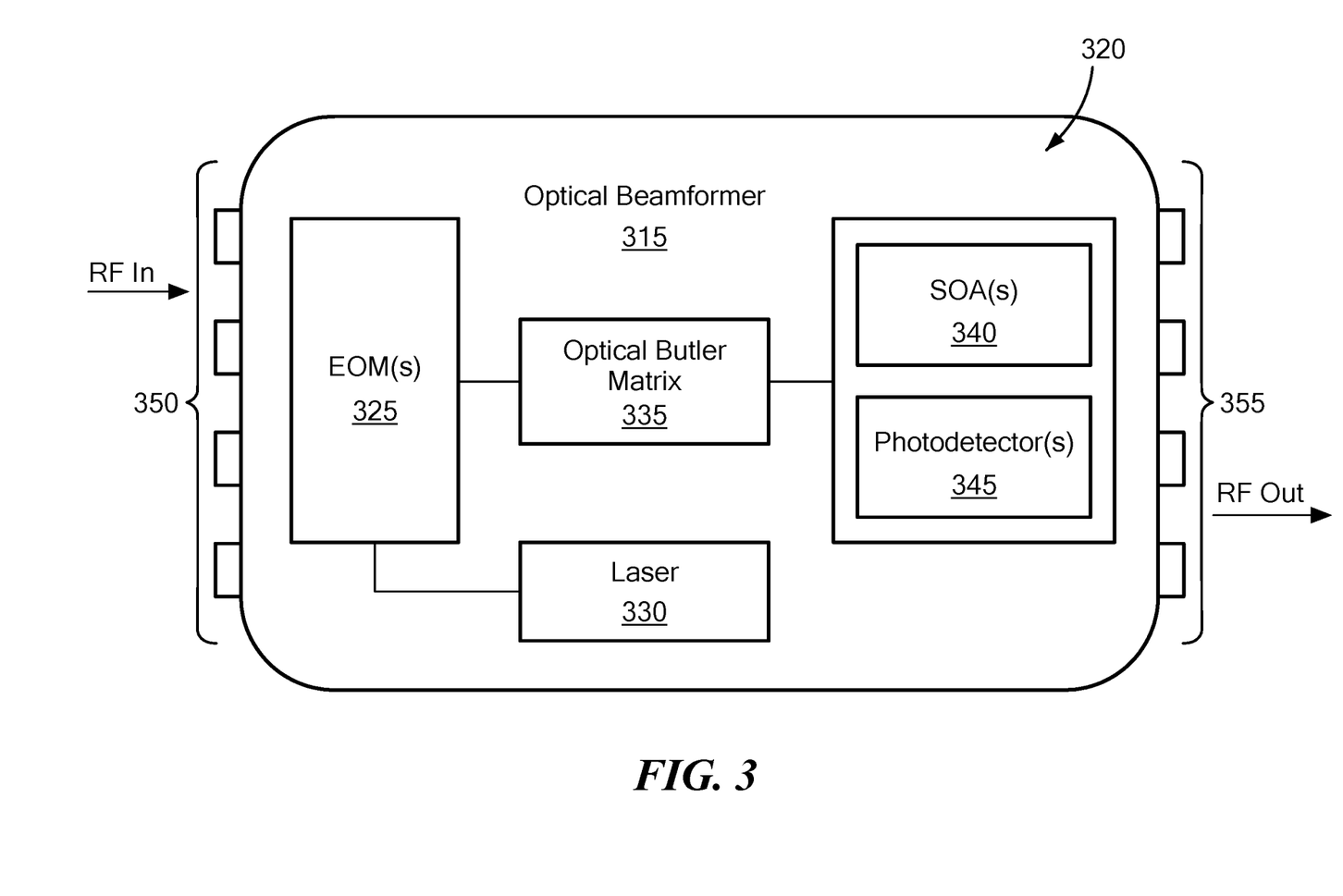
FIG. 3 is a block diagram of a PIC in accordance with described embodiments.

FIG. 2A is a block diagram of an optical beamformer 215 that is a photonic integrated circuit (PIC) (e.g., the PIC 315 of FIG. 3). The beamformer 215 is inserted into an RF device 200 via RF input/out (I/O) interface(s) 210 in accordance with described embodiments. The RF I/O interface(s) 210 enable the optical beamformer 215 to be inserted into any RF system. An RF system can be any front-end device (e.g., an access point) used for RF communications. For example, an RF system can be small cell device used for $5^{th}$ Generation (5G) mobile communications. 5G applications can include beamformers for hubs and stations operating at millimeter wavelengths. The RF system can also be any military based RF device such as those described in FIG. 1.

Figure 2B:
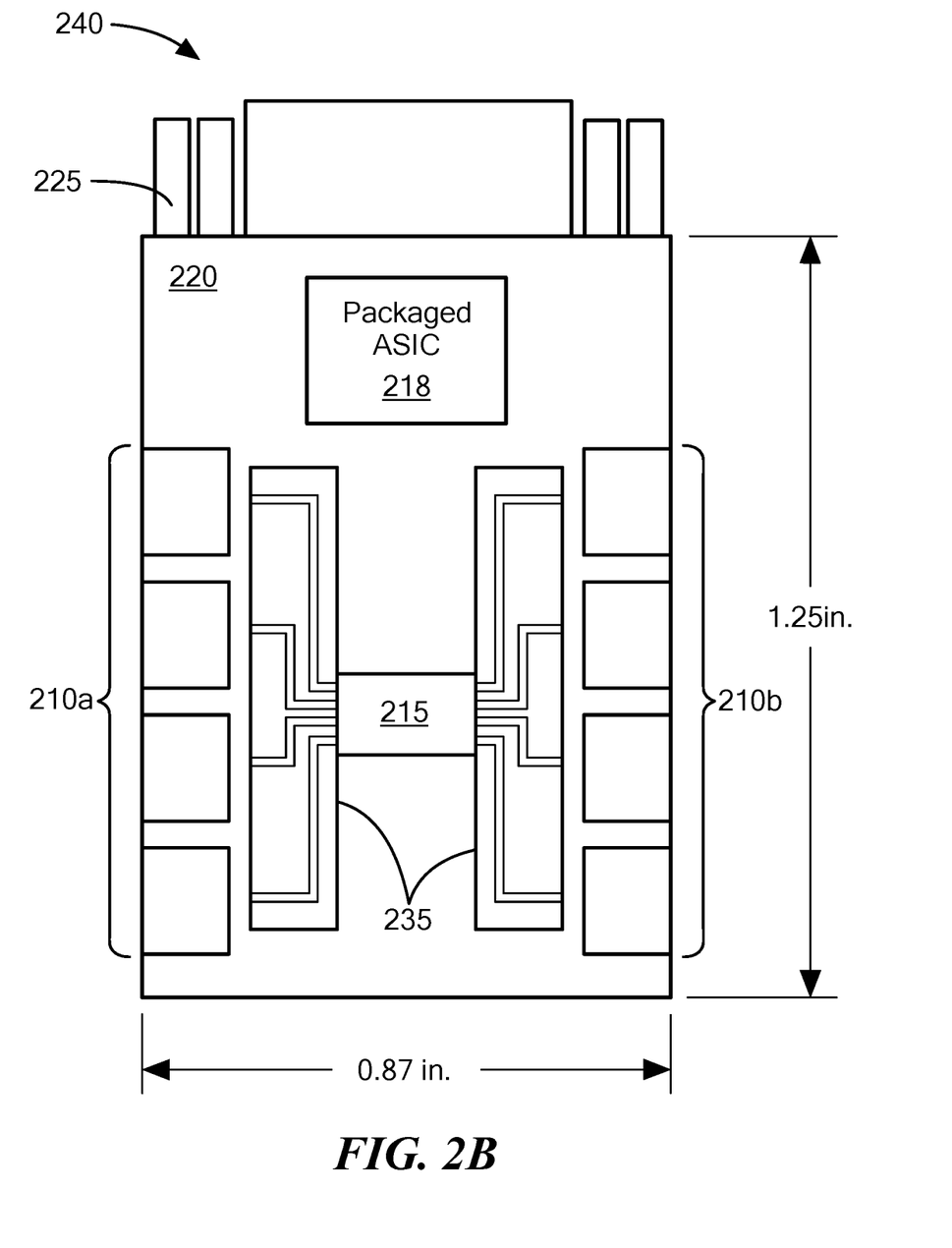

FIG. 2B is a block diagram of the optical beamformer 215 having a design that allows it to be inserted into most analog RF devices. First, components (e.g., optical and/or non-optical) of the optical beamformer 215 are built and integrated into a silicon wafer to create a photonic integrated circuit (PIC). In some embodiments, the PIC integrates all the photonic components in a single 3.3 mm×5.6 mm silicon wafer. The optical elements are described in greater detail with respect to FIGS. 3-8. Second, the PIC is mounted and packaged in a modular package 240 that includes a hermetic cavity 220 that comprises the optical beamformer 215, photonic integrated circuitry 235, RF I/O ports 215a-b, and connector pins 225. Third, the modular package 240 includes at least one application-specific integrated circuit (ASIC). The ASIC provides and regulates power to control and monitor the PIC. For example, the ASIC provides voltage and temperature monitoring for power and control.

The RF I/O port 210a-b and/or the connector pins 225 allow the modular package 240 to be inserted into any analog RF device. The photonic integrated circuitry 235 can be implemented as T/R module lines configured to enable RF/Optical integration.

The modular package has an estimated total area that is 0.87 inches by 1.25 inches that included the 3.3 mm×5.6 mm PIC 215. This form factor is significantly smaller than an analog beamformer whose total area is at least 5 inches×5 inches. Thus, the modular package 240 having RF components with a PIC on a single chip and has at least a 94% smaller footprint than existing purely analog counterparts.

FIG. 3 is a block diagram of an optical beamformer 315 in accordance with described embodiments. The optical beamformer 315 comprises a pair of RF I/O ports 350, 355, a laser 330, electro-optical modulator(s) (EOM(s)) 325, an optical butler matrix 335, silicon optical amplifier(s) (SOA(s)) 340, and photodetector(s) 345.

The optical beamformer 320 is a photonic integrated circuit (PIC) that is built on a silicon substrate (e.g., wafer) 320. The silicon substrate can be an III-V semiconductor that is built using known and yet to be known manufacturing processes. The optical beamformer 320 includes RF I/O ports 350, 355 that receive and out RF signals, respectively. In this example, there are a pair four (4) RF I/O ports. The beamformer 320 can have an n pairs of RF I/O ports One or more of the RF input ports 350 receive an RF signal and passes the signal to the EOM(s) 325. The EOM(s) 325 can be Mach-Zehnder modulators and/or any other electro-optical modular. The EOM(s) 325 receive an optical signal from the laser 330. The laser 330 can be an uncooled laser that may have an operational wavelength from 1310 nm-1550 nm. Accordingly, the laser can have a wavelength in the 1310 nm range and can contain energy to drive each of the EOM(s) 325 with equal amplitude and matched phase. The EOM(s) 325 modulate the optical signal based on characteristics of the received RF signal. Accordingly, the EOM(s) 325 output optical signals that are optical conversions of received RF signals. The optical butler matrix 335 received the output optical signal(s) from the EOM(s) 325 and generated a beamformed signal(s). The beamformed signal(s) is then passed to the SOA(s) 340 which amplify the beamformed signal(s). The photodetector(s) 345 then converts the optical beamformed signal(s) to an RF beamformed signal(s) that is output via one or more of the RF output ports 355. An RF device (e.g., the RF device 200 of FIG. 2A) then uses the RF beamformed signal(s) as discussed above with respect to FIGS. 1 and 2A-B.

Because the optical beamformer 315 uses an uncooled laser 330, the beamformer does not require thermoelectric cooling because the PIC 320 operates at a temperature range of +20° C. to +55° C. As such, the optical beamformer 315 has a power requirement that is less than 0.75 watts.

The optical beamformer 315 can have an instantaneous bandwidth from at least 1 Hz to 90 Ghz. Specifically, the instantaneous bandwidth is a function of the instantaneous bandwidth limitations of the EOM(s) 325 and/or the photodetector(s) 345. The EOM(s) 325 can have operating bandwidths up to 60 GHz. The photodetector(s) can have operating bandwidths up to 90 GHz.

Figure 4:
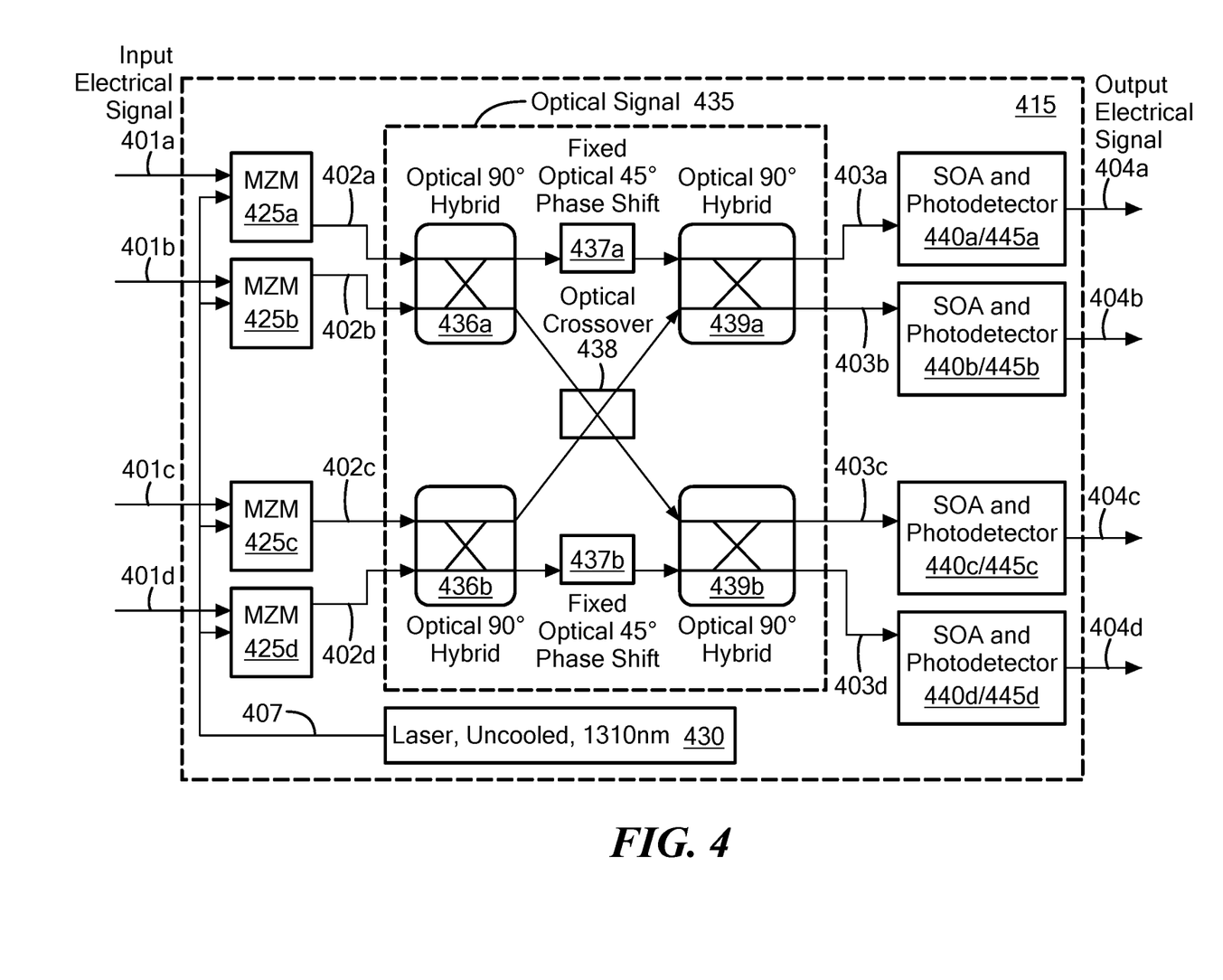
FIG. 4 is a block diagram of the components of a PIC in accordance with described embodiments.

FIG. 4 is a block diagram of the components of a PIC beamformer 415 in accordance with described embodiments. The PIC beamformer 415 comprises pairs of RF I/O ports 401a-d, 404a-d, a laser 430, electro-optical modulator (s) (EOM(s)) 425a-d, an optical butler matrix 435, silicon optical amplifier(s) (SOA(s)) 440a-d, and photodetector(s) 445a-d.

The PIC beamformer 415 received input electrical signals 401a-d. The input electrical signals are RF signals received via RF input ports (e.g., the RF input ports 350 of FIG. 3). EOMs 425a-d receive the RF signals and use them to modulate an optical signal 407 received from the laser 430. The laser 430 can be an uncooled laser that may have an operational wavelength from 1310 nm-1550 nm. The EOMs 425a-d output modulated optical signals 402a-d that correspond to the input RF signals 401a-d, respectively. The output modulated optical signals 402a-d are passed to an optical beamformer 435 that generates beamformed signals 403a-d from the modulated optical signals 402a-d.

The optical butler matrix 435 comprises input optical 90-degree hybrids 436a-b, fixed optical 45-degree phase shifters 437a-b, optical crossover 438, and output optical 90-degree hybrids 439a-b.

The input and output 90 degree hybrids 436a-b, 439a-b are four (4) port quadrature couplers that provide equal power splitting or combining with a relative phase offset of 90 deg between each output or input. The 45 deg phase shifters 437a-b apply a fixed 45 deg phase shift to the signal. The optical cross overs physically route the optical signals to keep them separate.

Once in the optical domain, the butler matrix 435 operates as a traditional RF butler matrix. The butler matrix increments the input signal in phase depending upon the selection of the input. Each output signal has a fixed relative phase from each other and to each input signal.

This results in different simultaneous beams such as four for the present butler matrix or eight (8) with a slightly more complex eight (8) element butler matrix that includes 22.5 degree phase shifts. Both four (4) element and eight (8) element optical butler matrix can be implemented in the optical PIC.

The SOAs 440a-d amplify the beamformed signals and provide a balanced amplitude for the beamformed signals. The photodetector(s) 345 convert the amplified and balanced beamformed signals to output RF beamformed signals 404a-d.

Figure 5:
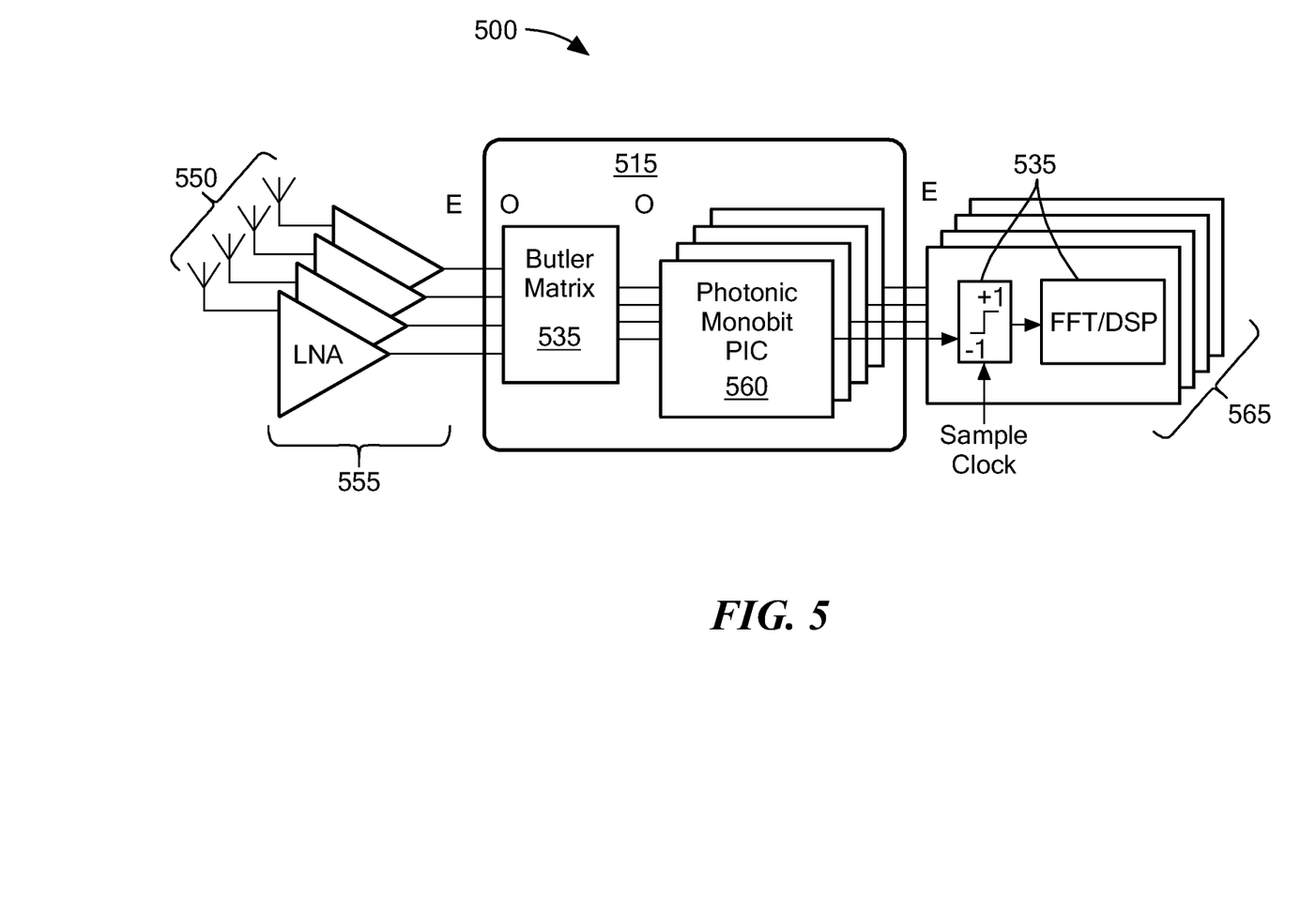
FIG. 5 is a block diagram of a PIC that includes an integrated optical butler matrix and a photonic monobit PIC in accordance with described embodiments.

FIG. 5 is a block diagram of an RF system 500 that includes a PIC 515 in accordance with described embodiments. The RF system 500 comprises antenna elements 550, low noise amplifiers (LNAs) 555, PIC 515, and signal processor(s) 565.

The antenna elements 550 are configured to receive RF signals. The received RF signals are converted into electrical signals which are passed to LNAs 555. The LNAs 555 amplify the electrical signals which are then passed to the PIC 515. The PIC 515 comprises an optical butler matrix 535 that generated optical beamformed signals from the received electrical RF signals. The optical beamformed signals are passed to the photonic monobit PIC 560. The photonic monobit PIC 560 digitizes the optical signal so that it can be digitally processed. That is, the photonic monobit PIC 560 is an optical version of an A/D converter for RF signal processing.

The photonic monobit PIC 560 also converts the optical beamformed signal into an RF electrical signal that is passed to signal processor 565. The signal processor 565 processes the resultant digitized signal (optical to digital bits). The signal processor 565 includes a clock 535 and frequency fourier transform (FFT)/digital signal processor (DSP) 535. The clock 535 provides a frequency rate that the signal samples at via the sampler. The FFT/DSP is used to process the digitized data stream.

Advantageously, the photonic monobit PIC 560 operates like a software defined radio (SDR) that performs direct sampling of an RF signal. Unlike, SDRs, the photonic monobit has no frequency or bandwidth limitations and directly digitizes the optical signal for use by the digital processing portion of the system.

Figure 6:
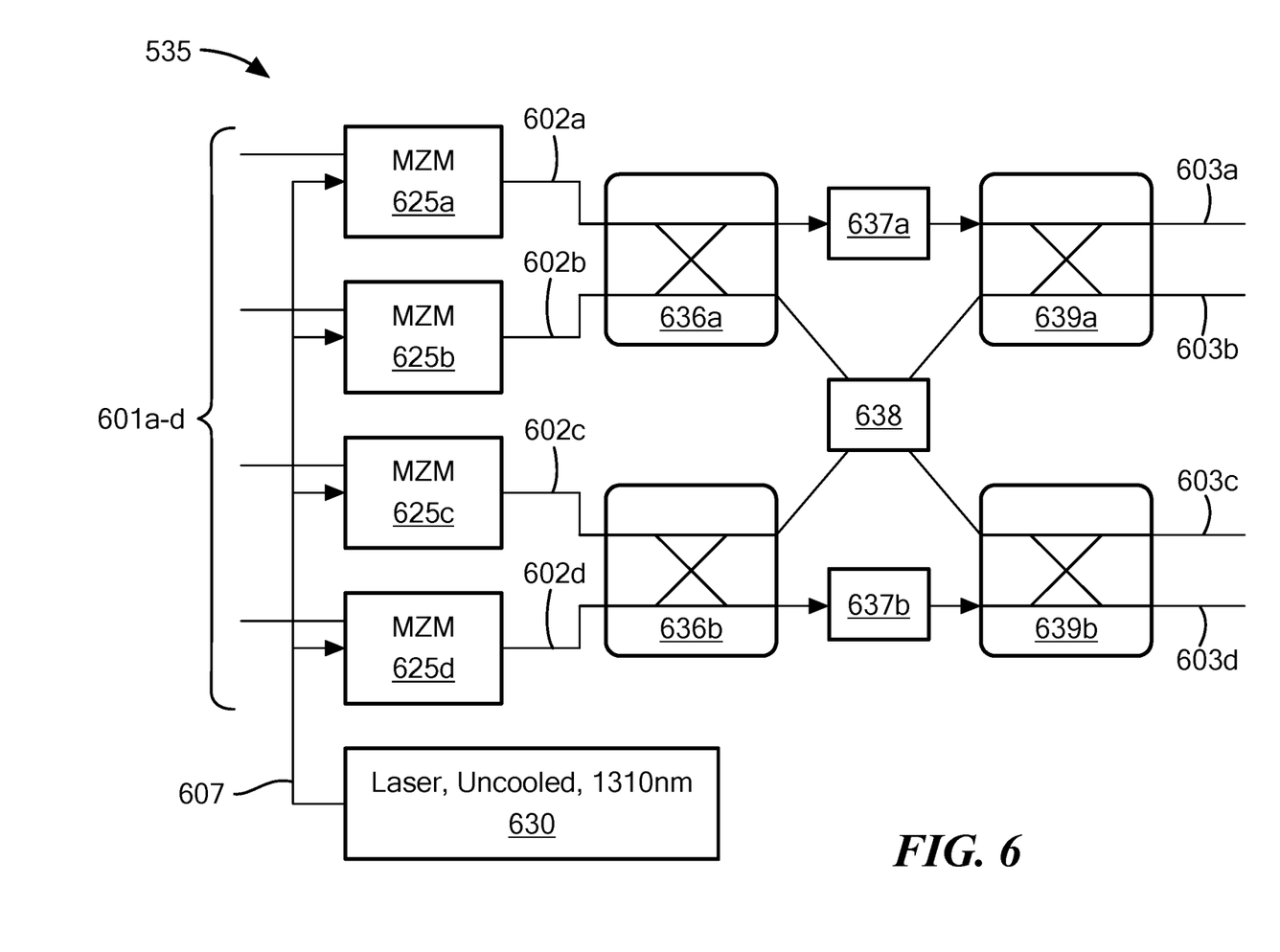
FIG. 6 is a block diagram of the optical butler matrix of FIG. 5 in accordance with described embodiments.

FIG. 6 is a block diagram of the optical butler matrix 535 of FIG. 5 in accordance with described embodiments. The optical butler matrix 535 is substantially similar to the beamformer 415 of FIG. 4; however, the optical butler matrix 535 does not include SOAs or photodectors. The SOAs and photodectors comprised within the photonic monobit PICs 560 as described with respect to FIG. 7 below.

The optical butler matrix 535 comprises RF I/O ports (not shown), a laser 630, electro-optical modulator(s) (EOM(s)) 625a-d, input optical 90-degree hybrids 636a-b, fixed optical 45-degree phase shifters 637a-b, optical crossover 638, and output optical 90-degree hybrids 639a-b.

The optical butler matrix 535 receives input electrical signals 601a-d via the RF input ports. EOMs 625a-d receive the RF signals and use them to modulate an optical signal 607 received from the laser 630. The laser 630 can be an uncooled laser that may have an operational wavelength from 1310 nm-1550 nm. The EOMs 625a-d output modulated optical signals 602a-d that correspond to the input RF signals 401a-d, respectively.

The output modulated optical signals 402a-d are passed to the input optical 90-degree hybrids 636a-b, fixed optical 45-degree phase shifters 637a-b, optical crossover 638, and output optical 90-degree hybrids 639a-b which, collectively, generate beamformed signals 603a-d from the modulated optical signals 602a-d.

Figure 7:
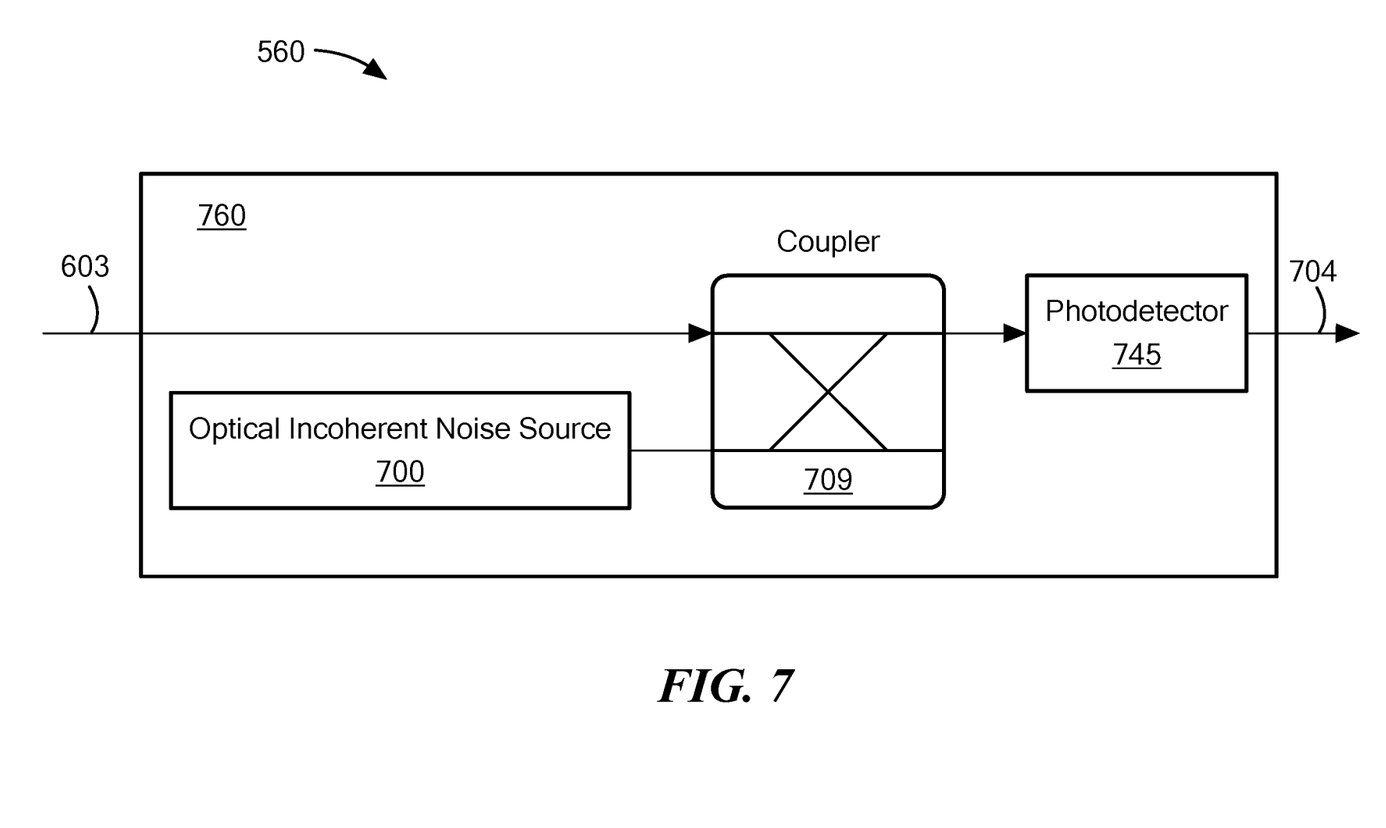
FIG. 7 is a block diagram of the photonic monobit PIC of FIG. 5 in accordance with described embodiments.

FIG. 7 is a block diagram of the photonic monobit PIC 560 of FIG. 5 in accordance with described embodiments. For each beamformed optical signal 603a-d of FIG. 6, a photonic monobit PIC 560 is provided in the optical beamformer 515 of FIG. 5. The photonic monobit PIC 560 is a photonic integrated circuit (PIC) that includes components (optical and/or RF) that are integrated on a silicon wafer 760. The photonic monobit PIC 560 comprises an optical incoherent noise source 700, coupler 709, and photodetector 745. The optical incoherent noise source 700 provides noise cancellation so that digitized bits at any voltage level have a voltage output above noise. Specifically, the optical incoherent noise source 700 generates an incoherent noise signal that is provided to the coupler 709 for noise cancellation.

The coupler 709 receives one of the optical beamformed signals 603 and couples it with the incoherent noise signal. Specifically, the coupler 709 provides a phase shift for noise cancellation. The coupler 709 outputs a coupled optical signal that is received by the photodetector 745. The photodetector 745 converts the coupled optical signal into an analog RF signal that is passed to, e.g., the signal processor 565 of FIG. 5.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A radio frequency (RF) photonic integrated circuit (PIC) comprising:
RF signal inputs and RF signal outputs;
a substrate having integrated components, the integrated components comprising:
one or more lasers configured to generate one or more laser signals;
signal paths, each signal path configured to receive a single laser from the one or more lasers, each signal path comprising:
an electro-optic modulator (EOM) communicatively coupled to the one or more lasers, the EOM configured to generate an output optical signal by modulating the single laser signal based on an input radio frequency (RF) signal on the RF signal inputs;
an optical butler matrix communicatively coupled to each of the signal paths and configured to generate an optical beamformed signal from the output optical signal; and
a photodetector configured to convert the optical beamformed signal to an output RF signal on the RF signal outputs.

2. The RF PIC of claim 1, wherein the one or more lasers are uncooled lasers.

3. The RF PIC of claim 2, wherein an uncooled laser is a laser that has an operational wavelength that is substantially 1310 nm.

4. The RF PIC of claim 2, wherein an uncooled laser is a laser that has an operational wavelength in a range from 1310 nm to 1550 nm.

5. The RF PIC of claim 1, wherein:
the substrate with its integrated components is a 50Ω device;
the substrate with its integrated components has an instantaneous bandwidth between 1 Hz and 90 GHz; and
the substrate with its integrated components is contained within a modular housing adapted to fit into an RF device.

6. The RF PIC of claim 1, wherein each signal path further comprises a silicon optical amplifier (SOA) communicatively coupled between the optical butler matrix and the photodetector, the SOA configured to amplify the optical beamformed signal.

7. The RF PIC of claim 1, wherein the substrate and its integrated components has an operational power requirement that is less than 0.75 watts.

8. A method comprising:
for a RF PIC having RF input and RF outputs, substrate having integrated components, lasers to generate laser signals, an electro-optic modulator, and optical butler matrix, and a photodetector, wherein the integrated components include the lasers, the electro-optic modulator, the optical butler matrix, and the photodetector,
providing a single optical channel for each input RF signal on the RF inputs, wherein each optical channel processes a single input RF signal of a plurality of input RF signals by:
converting the single input RF signal into an optical signal using the electro-optic modulator,
using the optical butler matrix, generating a beamformed optical signal from the optical signal, and
converting, using the photodetector, the beamformed optical signal to an output RF signal.

9. The method of claim 8, wherein converting the single input RF signal into an optical signal includes modulating the laser signals based on the single input RF signal.

10. The method of claim 9 further comprising generating the laser signal using an uncooled laser.

11. The method of claim 9 further comprising generating the laser signal using an uncooled laser having an operating wavelength in a range from 1310 nm to 1550 nm.

12. A radio frequency (RF) device comprising:
one or more sensors configured to receive one or more RF signals;
a photonic integrated circuit (PIC) configured to optically generate an RF beamformed signal for each received RF signal;
a processor configured to digitally process the RF beamformed signals; and
a substrate having integrated components, the integrated components comprising:
one or more lasers configured to generate one or more laser signals;
one or more signal paths, each signal path configured to receive a single laser signal from the one or more lasers, each signal path comprising:
an electro-optic modulators (EOM) configured to generate an output optical signal by modulating the single laser signal based on an input radio frequency (RF) signal;
an optical butler matrix communicatively coupled to each of the one or more signal paths and configured to generate an optical beamformed signal from the output optical signal; and
a photodetector configured to convert the optical beamformed signal to an output RF signal.

13. The RF device of claim 12, wherein the one or more lasers are uncooled lasers.

14. The RF PIC of claim 13, wherein an uncooled laser is a laser that has an operational wavelength that is substantially 1310 nm.

15. The RF PIC of claim 13, wherein an uncooled laser is a laser that has an operational wavelength in a range from 1310 nm to 1550 nm.

16. The RF PIC of claim 12, wherein the PIC is a 50Ω device.

17. The RF PIC of claim 12, wherein each signal path further comprises a silicon optical amplifier (SOA) communicatively coupled between the optical butler matrix and the photodetector, the SOA configured to amplify the optical beamformed signal.

18. The RF PIC of claim 12, wherein each signal path comprises a pair of RF input/output (I/O) ports.

19. The RF PIC of claim 12, wherein the PIC an operational power requirement that is less than 0.75 watts.

* * * * *